United States Patent [19]
Walker et al.

[11] Patent Number: 6,001,916
[45] Date of Patent: Dec. 14, 1999

[54] ULTRA HIGH SOLIDS VINYL ACETATE-ETHYLENE AND VINYL ACETATE HOMOPOLYMER EMULSIONS

[75] Inventors: James L. Walker, Whitehouse Station, N.J.; Pravin Kukkala, Louisville, Ky.

[73] Assignee: National Starch and Chemical Investment Holding Corporation, Wilmington, Del.

[21] Appl. No.: 09/170,917

[22] Filed: Oct. 13, 1998

Related U.S. Application Data

[63] Continuation-in-part of application No. 08/991,356, Dec. 16, 1997, abandoned.

[51] Int. Cl.⁶ ........................................ C08F 2/16
[52] U.S. Cl. ................................................ 524/459
[58] Field of Search ............................ 524/800, 459

[56] References Cited

U.S. PATENT DOCUMENTS

| | | | |
|---|---|---|---|
| 3,661,696 | 5/1972 | Knutson | 161/204 |
| 3,734,819 | 5/1973 | Knutson | 161/254 |
| 3,769,151 | 10/1973 | Knutson | 524/166 |
| 4,164,489 | 8/1979 | Daniels | 524/819 |
| 4,449,978 | 5/1984 | Iacoviello . | |
| 4,921,898 | 5/1990 | Lenney et al. . | |
| 5,070,134 | 12/1991 | Oyamada et al. . | |
| 5,084,503 | 1/1992 | Iacovielle | 524/459 |
| 5,110,856 | 5/1992 | Oyamada et al. . | |
| 5,124,394 | 6/1992 | Lenney . | |
| 5,629,370 | 5/1997 | Freidzon . | |
| 5,633,334 | 5/1997 | Walker et al. . | |

FOREIGN PATENT DOCUMENTS

| | | | |
|---|---|---|---|
| 0 279 384 B1 | 12/1988 | European Pat. Off. | C08F 218/08 |
| 0 389 893 A2 | 3/1990 | European Pat. Off. | C08F 218/08 |
| 06322031 A2 | 1/1993 | Japan | C08F 210/02 |

OTHER PUBLICATIONS

Article entitled "Ultra High Solids Copolymer Emulsion For Demanding Applications", by Mary Hausman, David Horwat, William Lenney; Adhesive Age; Oct., 1995; p. 49.

CA Selects: Colloids (Macromolecular Aspects), Issue 16, 1996, p. 11, Reference 125:60004p, Preparation of high–solids acrylate and/or vinyl acetate copolymer dispersion in the presence of a latex and its use in sealants, WO 96 11,234.

CA Selects: Synthetic High Polymers, Issue 13, 1995, p. 22, Reference 122:315373r, Manufacture of high–solids ethylene–vinyl ester copolymer aqueous emulsions without raising viscosity, JP 06,322,031.

*Primary Examiner*—Paul R. Michl
*Attorney, Agent, or Firm*—John D. Thallemer; Ellen T. Dec

[57] ABSTRACT

A process for the production of ethylene vinyl acetate based polymer emulsions having solids levels greater than about 65% by weight comprising the steps of:

i) providing a polymer seed selected from the group consisting of vinyl acetate, ethylene vinyl acetate, acrylic, vinyl-acrylic and styrene (meth) acrylic having a particle size of 0.15 to 2.5 microns;

ii) polymerizing vinyl acetate and ethylene monomers in the presence of 5 to 15% by weight of the final emulsion of said polymer seed;

said polymerization of step (ii) being carried out in the presence of a surfactant system comprising polyvinyl alcohol and a nonionic emulsifier.

22 Claims, No Drawings

ULTRA HIGH SOLIDS VINYL ACETATE-ETHYLENE AND VINYL ACETATE HOMOPOLYMER EMULSIONS

This application is a continuation-in-part of Ser. No. 08/991,356 filed on Dec. 16, 1997 and now abandoned.

BACKGROUND OF THE INVENTION

Aqueous polyvinyl alcohol stabilized polymer emulsions comprising ethylene vinyl acetate polymers find widespread applications as adhesives in the areas of packaging and converting and for vinyl laminating. For these uses, the adhesives are prepared and employed in emulsion form and, on removal of the aqueous medium, cure or harden at room temperature to form a bond which is desirably characterized by high strength and resistance to heat, humidity and water.

In recent years, there has emerged an increasing need for higher solids emulsions which will provide faster setting times for use on high speed production equipment. High solids adhesive bases may also find use as replacements for conventional hot melt (100% solids) material which require elevated temperatures with consequent expenditures of considerable energy. In addition to the need for high solids emulsions for such applications, it is also essential that the emulsion remain sufficiently low in viscosity that they can be applied using conventional equipment. Typically, desirable coating viscosities are in the range of 800–5000 cps at 25° C.

Various methods have been described for the preparation of vinyl acetate based emulsions at solids levels of about 60%–65%. These methods are described, for example, in U.S. Pat. Nos. 4,921,898, 5,070,134, 5,629,370 and EP 389,893 and generally rely upon the use of modified polyvinyl alcohols and/or specific surfactant systems. The methods described in these patents have not, however, been particularly useful in the preparation of emulsions at solids levels greater than about 65% by weight.

It is an object of the present invention to provide a process for the production of vinyl acetate based homo and copolymer emulsions at high solids levels, i.e., in excess of 65% and preferably greater than 70% solids while maintaining relatively low coating viscosities in the range of 1000 to 8000 cps, preferably 2000 to 5000, at 25° C.

SUMMARY OF THE INVENTION

We have now found that ethylene vinyl acetate based emulsions may be obtained at high solids levels while maintaining suitable coating viscosities by the addition to the ethylene/vinyl acetate emulsion process of low levels, i.e., less than 15% and preferably less than 10% of a polymer seed selected from the group consisting of vinyl acetate, ethylene vinyl acetate, acrylics, vinyl-acrylic and styrene acrylic polymers followed by polymerization of the ethylene and vinyl acetate using a specific combination of a polyvinylalcohol and nonionic emulsifier stabilizing system.

Conventional 55% solids polyvinyl alcohol stabilized adhesive emulsions generally have a relatively narrow particle size range of about 0.4 to 1.0 microns. As it has been recognized that particle size distribution is a major factor affecting the viscosity as well as the adhesive properties of the emulsion, this relatively narrow distribution range has had a substantial influence on producing the desired adhesive properties observed in conventional 55% solids emulsions. It has also been recognized that the presence of some large particles increases the average diameter, leading to a higher polydispersity in high solid emulsions. It is also generally recognized that the maximum volume solids concentration for uniform spheres is approximately 70%. Therefore, if one is to produce high solids levels it is essential that a more efficient particle packing be achieved, i.e. that there be an appropriate mix of both small and large particles are needed. However, as the percent solids are raised to 65% and higher, this wider particle size, broader particle size distribution, produces lower emulsion viscosity with a possible reduction in adhesive properties.

Surprisingly, we have found that addition of small amounts of a polymer seed to a polyvinyl alcohol/surfactant stabilized ethylene vinyl acetate provides for a broader particle size distribution, particularly in the larger particle size range, thereby facilitating a more efficient, and hence potentially higher solids level, emulsion. This process thus ensures the production of an extremely high solids emulsion while maintaining the coating viscosity ranges and adhesive performance which traditionally are associated with the lower solids, narrower particle size distribution emulsions.

It is therefore possible, using the techniques described herein to achieve a high solids, i.e. greater than about 70% solids emulsion, while maintaining the desirable coating viscosity, and other adhesive properties conventionally obtained with 55% solids emulsions. Moreover, the resultant emulsion is characterized by a very desirable viscosity index. That is to say, the change in viscosity under shearing conditions is linear (Newtonian) in nature, characterized by a viscosity index of about 1, as compared with other commercially available high solids products which are highly shear thinning. This Newtonian behavior facilitates better machining properties since it is easier to regulate and predict the amount of shear necessary to achieve the desired viscosity range.

While seeded processes have previously been used in the production of acrylic based emulsions, they have generally required the use of a higher amount of the seed, (i.e., 30–40% of the final products), and consequently have not been cost effective.

More particularly in the process of the present invention 5–15% by weight (of the final emulsion) of at least one polymer seed having a number average particle size of about 0.15 to 2.5 microns, preferably 0.3 to 1 micron, most preferably 0.4 to 0.8 microns, is added to the initial charge and then a typical polyvinyl alcohol/surfactant stabilized ethylene vinyl acetate polymerization process is performed.

The resultant product has a solids level of greater than 70%; typically 72–74% while maintaining a viscosity of 1000–8000 cps, preferably 2000 to 5000, at 25° C. Additionally, as discussed above, the process aids in broadening the particle size distribution of the emulsion, particularly at the high, (1–1.8 micron), larger size. The end use properties are also improved at the high solids, e.g., fast set speed, while high wet tack and good open time are also provided.

DETAILED DESCRIPTION OF THE PREFERRED EMBODIMENTS

Representative compositions suitable for use as the polymer seed emulsion are emulsions comprising vinyl acetate homopolymers; vinyl acetate-ethylene copolymers; vinyl acetate-(C1–C8) acrylate polymers; vinyl acetate-vinyl esters copolymers where the vinyl esters are C3–C9 such as VeOVA-9 or 10 from Shell; C1–C8 acrylic or methacrylic polymers: as well as copolymers of acrylic or methacrylic monomers with styrene.

The polymer seed emulsion is prepared by conventional (batch) emulsion polymerization techniques. In the case of vinyl acetate, vinyl-acrylic, acrylic or styrene-acrylic seed emulsion a typical monomers slow addition or semi-cointinuous monomers process is generally used.

In the case of the use of the preferred ethylene vinyl acetate polymer seeds, the vinyl acetate and ethylene are usually dispersed under a pressure of about 100 to 1,000 psig in an aqueous medium in the presence of partially hydrolyzed polyvinyl alcohol. In such cases, sufficient ethylene, generally from 10% up to a maximum of about 35%, by weight is added to achieve the desired Tg. The ethylene content can be controlled by regulating the process conditions during the polymerization reaction, such as the ethylene partial pressure, the temperature, or the amount of polymerization initiator employed. Correspondingly, the amount of vinyl acetate which is introduced into the polymerization is selected so that the seed emulsion contains between about 65 and 90 weight percent vinyl acetate in the ethylene-vinyl acetate copolymer and more preferably between about 70 to 85 weight percent vinyl acetate.

As a protective colloid in preparation of the polymer seed, polyvinyl alcohol (i.e., partially hydrolyzed polyvinyl acetate) is preferred and is used in amounts of 1 to 5% by weight. Generally, the degree of hydrolysis will vary from 50 to 98 percent, preferably from 80 to 98 percent of the acetate groups. The polyvinyl alcohol should also exhibit a viscosity of about 2 to 30 cps., preferably 3 to 45 cps for a 4 weight percent aqueous solution at 20° C. as determined by the Hoeppler falling ball method. Exemplary of the polyvinyl alcohol component include AIRVOL A205, a low molecular weight, 87 to 89 percent hydrolyzed polyvinyl acetate, and AIRVOL A523, an intermediate molecular weight, 87 to 89 percent hydrolyzed polyvinyl acetate, which are marketed by Air Products Corporation. Blends of various polyvinyl alcohols may also be used in order to better control the particle size distribution of the seed emulsion with a relatively narrow distribution being most preferred.

While it is preferable in the case of vinyl acetate and ethylene vinyl acetate seeds to use only polyvinyl alcohol as the stabilizer in producing the seed, it may also be possible to add low levels of nonionic emulsifiers or surface-active compounds. Examples of suitable non-ionic emulsifiers are the addition products of 5 to 70 moles of ethylene oxide adducted to straight-chained and branch-chained alkanols with 6 to 22 carbon atoms, or the corresponding C6–C22 alkylphenols, or higher fatty acids, or higher fatty amides, or primary and secondary higher alkyl amines; as well as block copolymers of propylene oxide with ethylene oxide and mixtures thereof. If used in the polymer seed, the emulsifiers are used in amounts of 0.5 to 2% by weight of the polymer.

It is also be possible to utilize purely surfactant stabilized polymer seeds such as those prepared in the presence of anionic surfactants or anionic/nonionic blends. While useful with vinyl acetate and ethylene vinyl acetate seeds, these surfactant systems are especially useful in the case of polymer seed emulsions prepared from all acrylic or styrene acrylic monomers. The surfactant stabilized systems typically contain 2 to 5% surfactant.

Representative anionic surfactants include anionic compounds obtained by sulfonation of fatty derivatives such as sulfonated tallow, sulfonated vegetable oils and sulfonated marine animal oils. Commercially available emulsifiers of this group are Tallosan RC, a sulfonated tallow marketed by General Dyestuff Corp; Acidolate, a sulfonated oil marketed by White Laboratories, Inc.; and Chemoil 412, a sulfonated castor oil marketed by Standard Chemical Co. Also useful are various sulfonated and sulfated fatty acid esters of mono- and polyvalent alcohols are also suitable such as Nopco 2272R, a sulfated butyl ester of fatty ester marketed by Nopco Chemical Company; Nopco 1471, a sulfated vegetable oil marketed by Nopco Chemical Company; Sandozol N, a sulfated fatty ester marketed by Sandoz, Inc.; and Stantex 322, an ester sulfate marketed by Standard Chemical Products, Inc. Sulfated and sulfonated fatty alcohols are also useful as an emulsifier and include anionic agents, such as Duponal ME, a sodium lauryl sulfate, Duponal L142, a sodium cetyl sulfate, Duponal LS, a sodium oleyl sulfate which is marketed by E.I. dePont de Nemours and Co.; and Tergitol 4, a sodium sulfate derivative of 7-ethyl-2-methyl, 4-undecanol, Tergitol 7, a sodium sulfate derivative of 3,9-diethyl tridecanol-6 and Tergitol 08, a sodium sulfate derivative of 2-ethyle-1-hexanol, which are marketed by Union Carbide Corp., Chemical Division. Preferred anionic emulsifiers are the alkyl esters of the alkali metal salts of sulfosuccunic acid. Exemplary emulsifiers include Disodium N-octadecyl sulfosuccinamate marketed under the trademark AEROSOL 18; the disodium ethoxylated alcohol half esters of sulfosuccinic acid marketed under the trademark AEROSOL 1-101, A-102, and A-103; the diamyl lester of sodium sulfosuccinic acid marketed under the trademark AEROSOL AY; the diisobutyl, dioctyl and dihexyl ester of sodium sulfosuccinic acid marketed under the respective trademarks AEROSOL IB, AEROSOL GPG, OT and OT-B and AEROSOL MA; and the bis (-tridecyl) ester of sodium sulfosuccinic acid marketed under the trademark AEROSOL TR. The aerosol emulsifiers are marketed by the American Cyanamid co., Industrial Chemicals and Plastics Division.

Those skilled in the art can readily design the particular stabilization system in conjunction with the specific monomers present to produce the desired particle size range for the seed emulsion.

Suitable as polymerization initiators are the water-soluble free-radical-formers generally used in emulsion polymerization, such as hydrogen peroxide, sodium persulfate, potassium persulfate and ammonium persulfate, as well as t-butyl hydroperoxide, in amounts of between 0.01 and 3% by weight, preferably 0.1 and 1% by weight based on the total amount of the emulsion. They can be used alone or together with reducing agents such as sodium formaldehyde-sulfoxylate, iron-II-salts, sodium dithionite, sodium hydrogen sulfite, sodium sulfite, sodium thiosulfate, ascorbic acid, erythorbic acid as redox catalysts in amounts of 0.01 to 3% by weight, preferably 0.1 to 1% by weight, based on the total amount of the emulsion. The free-radical-formers can be charged in the aqueous emulsifier solution or be added during the polymerization in doses.

The polymerization is carried out at a pH of between 2 and 7, preferably between 3 and 5. In order to maintain the pH range, it may be useful to work in the presence of customary buffer systems, for example, in the presence of alkali metal acetates, alkali metal carbonates, alkali metal phosphates. Polymerization regulators, including mercaptans such as mercaptoacetic acid and mercaptoethanol; aldehydes; chloroform; methylene chloride and trichloroethylene, may also be added.

The reaction is generally continued until the residual monomer content is below about 1%. Preferably the copolymerization reaction is conducted so that the seed emulsion has an average diameter within about 0.15 to 2.5 microns, preferably 0.3 to 1 micron, most preferably 0.4 to 0.8 microns. The completed reaction product is then allowed to cool to about room temperature, while sealed from the atmosphere. After degassing, the pH may then be suitably adjusted to insure maximum stability. Other adjustments or additions may optionally be made at this time, as desired.

While the particular solids level of the seed emulsion is not critical to the invention since it is subsequently diluted, levels of about 55% solids are most readily available and therefore are conveniently employed; however, seed solid levels of about 35 to 72% have been utilized herein. The seed emulsion may comprise one of those described above or may be a blend thereof, provided the amount and average particle size of the blend falls within the required range.

The final high solids emulsion may be prepared directly after production of the polymer seed or the seed may be separately prepared and stored indefinitely until preparation of the final emulsion is desired.

In producing the high solids emulsion, the vinyl acetate, ethylene, polyvinyl alcohol, nonionic surfactant and the seed emulsion are emulsified in an aqueous medium having a pH between about 3 and 9. A free radical precursor is incorporated in the emulsion under pressure and the emulsion is heated to decompose the precursor and release free radicals which initiate polymerization of the ethylene and vinyl acetate monomer within the emulsion. A similar process can be performed using a major portion of the vinyl acetate (i.e. about 40–60%) initially, with the remainder being slow-added during the course of the reaction.

The amount of seed emulsion charged to the reactor will vary over a wide range depending upon the reaction conditions and the selected adhesive emulsion contents. Generally the amount of seed emulsion ranges from 5 to about 15 weight percent and preferably between about 5 and 10 weight percent of the adhesive emulsion product. It has been found that the use of amounts of seed substantially in excess of about 15 weight percent does not provide further benefit and is not cost effective.

The polymerization reaction is conducted so that the amount of ethylene in the resulting final copolymer is maintained between about 10 and 35 weight percent to provide a polymer having a Tg of +20 to –30° C., preferably 0 to –15° C. The ethylene content in the copolymer can be controlled by regulating the process conditions during the polymerization reaction in the same manner as disclosed supra in the preparation of the seed emulsion.

Further enhancement in adhesive properties may be obtained by the incorporation of various functional monomers. These monomers are added in amounts of 0.5 to 10% by weight, preferably 1 to 5% by weight of the total polymer solids. Examples of suitable functional monomers are carboxylic acids, such as acrylic, methacrylic and maleic acid as well as hydroxyl and amide functional monomers, e.g. hydroxyethylacrylate, hydroxypropylacrylate, acrylamide, N-vinyl formamide, N-vinyl acetamide and the like. Crosslinking monomers can also be present.

It will be understood that other comonomers conventionally used in compositions with ethylene and vinyl esters such as acrylates and maleates, e.g. butyl acrylate, may also be present. In particular, certain copolymerizable monomers which assist in the stability of the copolymer emulsion, e.g., vinyl sulfonic acid and 2-acrylamido-2-methylpropane sulfonic acid or their salts may be used herein as latex stabilizers. If present, these stabilizers are added in amounts of from about 0.2 to 1% by weight of the monomer mixture.

When such functional comonomers are employed, they are generally added to this second or final stage emulsion; however, in the case of monomers which do not homopolymerize, such as maleates, the monomer may be added into the initial charge.

As a protective colloid in preparation of the final emulsion, polyvinyl alcohol (i.e., partially hydrolyzed polyvinyl acetate) is used in amounts of 1 to 5% by weight. The grades of polyvinyl alcohol utilized in the seed polymerization are equally suitable herein with particular emphasis on low molecular weight types such as AIRVOL A205 and A203. In preparing the final emulsion, it is also necessary to utilize a nonionic emulsifying agent. A single emulsifying agent can be used or the emulsifying agents can be used in combination. The concentration range of the total amount of these emulsifying agents can be from 1 to 5 weight percent of the emulsion. The combined levels of the polyvinyl alcohol and emulsifying agent is generally in the range of 3.5 to 6% by weight of the emulsion.

Suitable nonionic emulsifying agents include polyoxyethylene condensates represented by the following general formula:

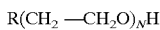

where R is the residue of a fatty alcohol, acid amide, alkyl phenol or amine having from 10 to 24 carbon atoms or an alkyl phenol having from 10 to 24 carbon atoms; and where n is an integer of 1 or above and preferably between 5 and 70. Most preferred are the ethoxylated alkyl phenols or ethoxylated alcohols (C11–C15) with 20 to 50 moles of ethylene oxide.

Some examples of nonionic emulsifying agents which can be used to include a polyoxethylene nonylphenyl ether marketed under the trademarks "IGEPAL CO-630," "IGEPAL CO-887," and "IGEPAL CO-897" as well as a polyoxyethylene octylphenyl ether marketed under the trademark "TRITON X" –100, 305, 405 and 705 or Igepal CA 630, 887, 897, CO 977 Other emulsifying agents include a polyoxyethylene oleyl ether and marketed under the trademark "ATLAS G-3915," and a polyoxyethylene lauryl ether marketed under the trademark "BRIJ 35." Also suitable are TERGITOL 15S5 to 15S40 containing 5–40 ethylene oxide units available from Union Carbide as well as SYNPERONIC A5 to A50 containing 5 to 50 carbon atoms from ICI.

While batch processes are most commonly used in the polymerization, it may also be possible to use a slow addition process in which a major portion of the vinyl acetate is added to the initial charge and the remaining slow added during the polymerization. This latter technique is particularly suited when functional monomers are present since these monomers are most readily combined with the remaining vinyl acetate and added slowly over the course of the polymerization.

As was the case in the seed polymerization, the polymerization reaction in the final emulsion is initiated by a water soluble free radical initiator such as a water soluble peracid or salt thereof, e.g., hydrogen peroxide, t-butyl hydroperoxide, sodium peroxide, lithium peroxide, peracetic acid, persulfuric acid or the ammonium and alkali metal salts thereof, e.g., ammonium persulfate, sodium peracetate, lithium persulfate, potassium persulfate, sodium peracetate, etc. A suitable concentration of the initiator is from 0.05 to 5.0 weight percent and preferably from 0.1 to 3 weight percent of the vinyl acetate monomer in the emulsion.

The free radical initiator can be used alone and thermally decomposed to release the free radical initiating species or can be used in combination with a suitable reducing agent in a redox couple. The reducing agent is typically an oxidizable sulfur compounds such as an alkali metal metabisulfite or pyrosulfite, sodium pyrosulfite, sodium formaldehyde sulfoxylate, ascorbic acid or erythorbic acid. The presence of the reducing agent in the polymerization medium achieves a release of free radicals at a lower temperature than necessary in its absence and thereby promotes formation of higher molecular weight copolymer products. The amount of reducing agent which can be employed throughout the copolymerization generally varies from about 0.1 to 1 weight percent of the amount of vinyl acetate monomer Buffering agents can be employed in the above mentioned polymerization reaction and these can generally comprise any water soluble additive capable of adjusting the pH of the water to the desired level while being relatively inert to the polymerization reaction. Exemplary buffer agents include ammonium and alkali metal salts of weak acids such as diammonium orthophosphate, tetrasodium pyrophosphate, sodium acetate, potassium acetate, etc. Alkali metal or ammonium carbonates and bicarbonates, such as sodium carbonate, sodium bicarbonate, potassium carbonate, potassium bicarbonate, etc., can also be employed.

The resulting high solids emulsion can be used neat or can be diluted and/or formulated with conventional additives such as plasticizers, buffering agents, defoamers, dyes, and the like.

In the following examples all parts are by weight and all temperatures in degree Celsius unless otherwise specified.

In the examples, the following raw materials were utilized:

| Raw Materials | | | Suppliers |
| --- | --- | --- | --- |
| Aerosol 102 | Anionic Surfactant | Mono-fester ethoxylated alcohol sulfosuccinate | Cytec Industries |
| Airvol 107 | Low Viscosity PVOH | 98% hyd. 350–650 Degree of Polymerization | Air Products |
| Airvol 205 | Low Viscosity PVOH | 88% hyd. 350–650 Degree of Polymerization | Air Products |
| Airvol 203 | Ultra Low Viscosity PVOH | 88% hyd. 150–300 Degree of Polymerization | Air Products |
| Airvol 523 | Med. Visc. PVOH | 88% hyd. 1000–1500 Degree of Polymerization | Air Products |
| Airvol 425 | Med. Visc. PVOH | 95% hyd. 1000–1500 Degree of Polymerization | Air Products |
| Goshonol KL05 | Low Visc. PVOH | 80% hyd. 300–500 Degree of Polymerization | Nippon Gohsei |
| Tergitol 15S5 | Nonionic Surfactant | Linear (Secondary) Alcohol ethoxylate (5EO) | Union Carbide Corp. |
| Tergitol 15S40 | Nonionic Surfactant | Linear (Secondary) Alcohol ethoxylate (40EO) | Union Carbide Corp. |
| Igepal CA 897 | Nonionic Surfactant | Octyl Phenol--Ethoxylate (40E0) | Rhone-Poulenc |
| Igepal CO 977 | Nonionic Surfactant | Nonyl Phenol--Ethoxylate (50E0) | Rhone-Poulenc |
| Triton X-705 | Nonionic Surfactant | Octyl Phenol--Ethoxylate (70E0) | Union Carbide |
| Synperonic A50 | Nonionic Surfactant | $C_{13-15}$ Synthetic Alcohol Ethoxylate (50E0) | ICI |
| Synperonic A20 | Nonionic Surfactant | $C_{13-15}$ Synthetic Alcohol Ethoxylate (20E0) | ICI |
| Benzoflex 50 | Plasticizers | ethylene/propylene glycol tibenzoate | Velsicol Corp. |

EXAMPLE 1

A general procedure for the preparation of a vinyl acetate-ethylene copolymer emulsion of the invention is as follows:

A. Preparation of the Seed Emulsion

The seed emulsion is a standard polyvinyl alcohol stabilized type EVA emulsion. It can be prepared as follows:

The initial aqueous charge to the reactor includes the following:

| | |
| --- | --- |
| Water (deionized) | 1050.0 g |
| Ferrous sulfate (1% aq. sol'n) | 16.0 |
| Airvol 205 (25% aq. sol'n) | 240.0 |
| Airvol 523 (10% aq. sol'n) | 1000.0 |
| Igepal CA-897 | 40.0 |
| Sodium bicarbonate | 0.5 |
| Sodium Formaldehyde Sulfoxylate (SFS) | 1.5 |
| Phosphoric acid | 1.5 |
| Vinyl acetate | 4000.0 g |
| Ethylene—amount to equilibrate reactor to 600 psi at 50° C. | |

-continued

| Slow additions: | |
| --- | --- |
| 1. Water (deionized) | 200.0 g |
| Hydrogen peroxide (30% aq. sol'n) | 11.0 |
| 2. Water (deionized) | 200.0 g |
| Sodium Formaldehyde Sulfoxylate | 8.0 |

The pH of the initial aqueous charge was adjusted to 4.0–4.3 with the phosphoric acid.

A 10L stainless steel pressure reactor was filled with the initial aqueous mix. It was flushed with nitrogen. With the agitation at about 250 rpm, the vinyl acetate was added. After closing all reactor ports, it was purged twice with nitrogen (25 to 40 psi) and then with ethylene (50 psi). It was then heated to 50° C. Agitation was increased to 550 rpm and it was pressurized with ethylene to 600 psi. The reactor temperature and ethylene pressure were allowed to equilibrate for 15–20 minutes. The ethylene supply was then closed off. Agitation was reduced to 500 rpm.

The reaction was initiated by starting both slow-additions (no.1 and 2) at 2.5 hr. rates (80 cc/hr). After the initial temperature rise, about 2–5° C., the jacket temperature and oxidizer rate (no.1) were adjusted to allow the temperature to reach 80° C. in about 30 minutes. The oxidizer rate was then adjusted to maintain a 20–30° C. average temperature delta (reaction temperature minus jacket temperature). The reducer addition (No. 2) was added at the set rate of 2.5 hours.

The reaction was run until the residual vinyl acetate is reduced to 1.5–2.0% (about 2–2.5 hrs). It was then cooled to 45° C. and transferred to the degassing tank to vent off residual ethylene pressure. Defoamer, Colloid 681f (Allied Colloids), was added to the degassing tank followed by finishing redox initiator including 15 g of a 6% hydrogen peroxide solution, waiting 5 minutes, then 15 g of a 4% SFS solution added over 15 minutes. The latter reduced the vinyl acetate to<0.5%. After cooling to 30° C., the pH was adjusted to 4–5 with 14% ammonium hydroxide.

The emulsion had the final properties:

| | |
| --- | --- |
| Solids, % | 55.0 |
| Viscosity (20 rpm, RVT#3) | 2700 cps |
| pH | 4.2 |
| % grit (200 mesh) | 0.02 |
| Tg, ° C. | +1° |
| Particle Size (number average) | 0.70 (microns) |

B. Preparation of the High Solids Emulsion

The initial charge to the reactor included the following:

| | |
|---|---|
| Water (deionized) | 1050.0 g |
| Ferrous sulfate (1% aq. sol'n) | 16.0 |
| Airvol 205 (25% aq. sol'n) | 100.0 |
| Airvol 203 (25% aq. sol'n) | 380.0 |
| Igepal CO-977 | 67.0 |
| Triton X-705 | 67.0 |
| Sodium bicarbonate | 0.7 |
| Seed Emulsion (55% solids) | 425.0 |
| Ascorbic acid | 1.5 |
| Phosphoric acid | 1.5 |
| Vinyl acetate | 4000.0 g |
| Ethylene—amount to equilibrate reactor to 600 psi at 50° C. | |
| Slow additions: | |
| 1. Water (deionized) | 200.0 g |
| t-butyl hydroperoxide (70% aq. sol'n) | 12.5 |
| 2. Water (deionized) | 200.0 g |
| Ascorbic acid | 8.0 |

The pH of the initial aqueous charge was adjusted to 4.0–4.3 with the phosphoric acid.

A 10L stainless steel pressure reactor was filled with initial aqueous mix. It was flushed with nitrogen. With the agitation at about 250 rpm, the vinyl acetate was added. After closing all reactor ports, it was purged twice with nitrogen (25 to 40 psi) and then with ethylene (50 psi). It was then heated to 50° C. Agitation was increased to 550 rpm and it was pressurized with ethylene to 600 psi. The reactor temperature and ethylene pressure were allowed to equilibrate for 15–20 minutes. The ethylene supply was then closed off. Agitation was reduced to 500 rpm.

The reaction was initiated by starting both slow-additions (no.1 and 2) at 2.5 hr. rates (80 cc/hr). After the initial temperature rise, about 2–5° C., the jacket temperature and oxidizer rate (no. 1) were adjusted to allow the temperature to reach 80° C. in about 30 minutes. The oxidizer rate was then adjusted to maintain a 20–30° C. average temperature delta (reaction temperature minus jacket temperature). The reducer addition (No. 2) was added at the fixed rate for 2.5 hours.

The reaction was run until the residual vinyl acetate is reduced to 1.5–2.0% (about 2–2.5 hrs.). It was then cooled to 45° C. and transferred to the degassing tank to vent off residual ethylene pressure. Defoamer, Colloid 681f (Allied Colloids), was added to the degassing tank followed by finishing redox initiator, including 15 g of a 6% t-butyl hydroperoxide solution, waiting 5 minutes, then 15 g of a 6% ascorbic acid solution added over 15 minutes. The latter reduced the vinyl acetate to<0.5%. After cooling to 30° C., the pH is adjusted to 4–5 with 14% ammonium hydroxide.

The emulsion had the final properties:

| | |
|---|---|
| Solids, % | 72.0 |
| Viscosity (20 rpm, RVT#3) | 3500 cps |
| pH | 4.2 |
| % grit (200 mesh) | 0.015 |
| Tg, ° C. | 0 |

When tested both neat and 10% plasticized, the resulting emulsions exhibited excellent adhesive properties, e.g. fast set speed, commercially acceptable open time, high wet tack, good adhesion to various substrates (e.g. kraft, untreated polyethylene) as well as heat resistance. Additionally, when formulated with 10% Benzoflex 50 plasticizer (a glycol benzoate from Velsicol Chemical Corp.) and tested on labelling equipment, the adhesive exhibited high tack and faster set speed than conventional (55% solids) ethylene vinyl acetate emulsions and was characterized by a more Newtonian rheology and provided faster machine speeds than a conventionally available (72% solids) ethylene vinyl acetate product.

The examples which follow illustrate the utility of this invention in producing high solids emulsions in the 70%–72% range with acceptable viscosity, 1000–8000 cps, preferably 2000–5000, using different seed emulsions, with different polyvinylalcohol and surfactant types and levels. In the following examples the final emulsion solids were in the 72.5–73.5 range, but were adjusted to 72% for comparison of viscosity at similar solids.

Comparative Example

For comparative purposes an emulsion was prepared according to Example 1, without the seed emulsion present.

| | | |
|---|---|---|
| Results: | 71.8% Solids | 28,750 cps Viscosity |

EXAMPLE 2

A. The seed of Example 1 was modified by replacing A205 with 70g of Triton X-45 surfactant and the water was adjusted by adding 70 g to maintain the same emulsion solids. The resultant seed particle size was 0.67 microns (number average).

B. The high solids emulsion was made in the same manner as in Example 1.

| | | |
|---|---|---|
| Results: | 71.1% Solids | 4600 cps |

EXAMPLE 3

A. The seed of Example 2 was used.
B. The PVOH type in the final emulsion was changed as follows:

| | | |
|---|---|---|
| | Airvol 205 (25% aq. sol'n) | 112.0 g |
| | Airvol 203 (25% aq. sol'n) | 448.0 g |
| Results: | 72.0% Solids | 3220 cps |

EXAMPLE 4

A. The same seed used in Examples 2 and 3 was used.
B. The level of PVOH and surfactant was changed; the final emulsion recipe was modified as follows:

| | | |
|---|---|---|
| | Water (deionized) | 1050.0 g |
| | Ferrous sulfate (1% aq. sol'n) | 16.0 |
| | Airvol 205 (25% aq. sol'n) | 56.0 |
| | Airvol 203 (25% aq. sol'n) | 414.0 |
| | Igepal CO-977 | 67.0 |
| | Triton X-705 | 67.0 |
| | Sodium bicarbonate | 0.7 |
| | Seed Emulsion (55% solids) | 425.0 |
| | Ascorbic acid | 1.5 |
| | Phosphoric acid | 1.5 |
| Results: | 72.0% Solids | 3600 cps |

EXAMPLE 5

A. The seed emulsion was made using a combination of PVOH as follows in the initial charge:

| | |
|---|---|
| Water (deionized) | 1000.0 g |
| Ferrous sulfate (1% aq. sol'n) | 16.0 |
| Airvol 425 (10% aq. sol'n) | 800.0 |
| Goshenol KL-05(25% aq. sol'n) | 200.0 |
| Airvol 523 (10% aq. sol'n) | 300.0 |
| Igepal CA-897 | 40.0 |
| Sodium bicarbonate | 0.5 |
| Sodium Formaldehyde Sulfoxylate (SFS) | 1.5 |
| Phosphoric acid | 1.5 |

The particle size of the seed was 0.5 microns (number average).

| | | |
|---|---|---|
| Seed Results: | 56% Solids | 1500 cps Viscosity |

B. The final emulsion was prepared as in Example 4, except 67 g of 70% solution of Tergitol 15S40 was substituted for the Igepal and Triton surfactants.

| | | |
|---|---|---|
| Results: | 72.0% Solids | 2100 cps Viscosity |

EXAMPLE 6

A. The seed of Example 5 was used at the same 5 parts level.
B. The final emulsion was made as Example 1.

| | | |
|---|---|---|
| Results: | 72.0% Solids | 3000 cps. Viscosity |

EXAMPLE 7

A. The seed of Example 5 was used.
B. The surfactant in the final emulsion recipe was changed to use 67 g of a 70% solution Synperonic A50.

| | | |
|---|---|---|
| Results: | 72.0% Solids | 3620 cps. Viscosity |

EXAMPLE 8

A. The seed of Example 1 was used.
B. The final emulsion Example was modified to use 10 parts seed emulsion. The level of PVOH and surfactant was changed; the final emulsion recipe was modified as follows:

| | | |
|---|---|---|
| | Water (deionized) | 950.0 g |
| | Ferrous sulfate (1% aq. sol'n) | 16.0 |
| | Airvol 205 (25% aq. sol'n) | 56.0 |
| | Airvol 203 (25% aq. sol'n) | 414.0 |
| | Igepal CO-977 | 33.0 |
| | Triton X-705 | 33.0 |
| | Sodium bicarbonate | 0.7 |
| | Seed Emulsion (55% solids) | 850.0 |
| | Ascorbic acid | 1.5 |
| | Phosphoric acid | 1.5 |
| Results: | 70.0% Solids | 3450 cps Viscosity |

EXAMPLE 9

A. The seed of Example 2 was used.
B. The final emulsion Example 1 was modified to use 10 parts seed emulsion. The level of PVOH and surfactant was changed; the final emulsion recipe was modified as follows:

| | | |
|---|---|---|
| | Water (deionized) | 950.0 g |
| | Ferrous sulfate (1% aq. sol'n) | 16.0 |
| | Airvol 205 (25% aq. sol'n) | 100.0 |
| | Airvol 203 (25% aq. sol'n) | 375.0 |
| | Igepal CO-977 | 67.0 |
| | Triton X-705 | 67.0 |
| | Sodium bicarbonate | 0.7 |
| | Seed Emulsion (55% solids) | 850.0 |
| | Ascorbic acid | 1.5 |
| | Phosphoric acid | 1.5 |
| Results: | 71.7% Solids | 5140 cps Viscosity |

EXAMPLE 10

A. The seed of Example 5 was used.
B. The final emulsion was modified in PVOH and surfactant level as follows. The PVOH of Example 5 was used and the surfactant was changed to Synperonic A20 as follows:

| | | |
|---|---|---|
| | Airvol 205 (25% aq. sol'n) | 56.0 g |
| | Airvol 203 (25% aq. sol'n) | 414.0 |
| | Synperonic A20 (60%) | 78.0 |
| Results: | 72.5% Solids | 4100 cps Viscosity |

EXAMPLE 11

A. The seed of Example 2 was used.
B. The final emulsion recipe of Example 1 was used with an increase in the initial ethylene pressure to 750 psi, and the ethylene pressure was maintained at 1150 psi for the first two hrs of the reaction. The object was to make a softer, lower Tg final product. The final emulsion had a Tg of −12° C.

| | | |
|---|---|---|
| Results: | 73.2% Solids | 6560 cps Viscosity |

Examples 12 and 13 show the use of functional monomer in the final high solids emulsion.

EXAMPLE 12

A. The seed of Example 5 was used.
B. The final emulsion of Example 5 was modified by adding 95.0 g of mono-2 ethylhexyl maleate to the initial charge.

| | | |
|---|---|---|
| Results: | 70.6% Solids | 2045 cps Viscosity |

EXAMPLE 13

A. The seed of Example 5 was used.
B. The final emulsion of Example 5 was modified as follows:
Initial charge: same
A slow add of 70 g of N-vinyl formamide in 100 g water was added over 2 hours of the reaction. The water level was adjusted to maintain the high solids by removing 70 grams water from the initial charge.

| Results: | 68% Solids | 2880 cps Viscosity |

EXAMPLE 14

A. The seed of Example 2 was used.
B. The final emulsion was made using of combination of different percent hydrolysis PVOH as follows:

| | Water (deionized) | 1050.0 g |
|---|---|---|
| | Ferrous sulfate (1% aq. sol'n) | 16.0 |
| | Airvol 107 (25% aq. sol'n) | 70.0 |
| | Airvol 203 (25% aq. sol'n) | 395.0 |
| | Goshenol KL-05 (25% aq. sol'n) | 94.0 |
| | Igepal CO-977 | 50.0 |
| | Triton X-705 | 50.0 |
| | Sodium bicarbonate | 0.7 |
| | Seed Emulsion (55% solids) | 425.0 |
| | Ascorbic acid | 1.5 |
| | Phosphoric acid | 1.5 |
| Results: | 72.5% Solids | 5120 cps Viscosity |

When the emulsions produced in Examples 2–14 were evaluated for adhesive properties, similar properties were observed as were described in Example 1.

EXAMPLE 15
(Vinyl Acetate/Ethylene Seed)

This example illustrates the preparation of a vinyl acetate-ethylene copolymer emulsion similar to that produced in Example 1.

A. Preparation of the Seed Emulsion

The seed emulsion is a standard polyvinyl alcohol stabilized type EVA emulsion. It can be prepared as follows:

The initial aqueous charge to the reactor includes the following:

| Water (deionized) | 1170.0 g |
|---|---|
| Ferrous sulfate (1% aq. sol'n) | 7.0 |
| Airvol 425 (10% aq. sol'n) | 1000.0 |
| Airvol 523 (10% aq. sol'n) | 125.0 |
| Goshonol KL-05(15%) | 590.0 |
| Sodium bicarbonate | 0.2 |
| Sodium Formaldehyde Sulfoxylate (SFS) | 0.8 |
| Phosphoric acid | 1.5 |
| Vinyl acetate | 4000.0 g |
| Ethylene—amount to equilibrate reactor to 550 psi at 50° C. | |
| Slow additions: | |
| 1. Water (deionized) | 200.0 g |
| Hydrogen peroxide (30% aq sol'n) | 11.0 |
| 2. Water (deionized) | 200.0 g |
| Sodium Formaldehyde Sulfoxylate | 8.0 |
| Sodium acetate | 0.8 |

The pH of the initial aqueous charge was adjusted to 4.0–4.3 with the phosphoric acid.

A 10L stainless steel pressure reactor was filed with the initial aqueous mix. It was flushed with nitrogen. With the agitation at about 250 rpm, the vinyl acetate was added. After closing all reactor ports, it was purged twice with nitrogen (25 to 40 psi) and then with ethylene (50 psi). It was then heated to 50° C. Agitation was increased to 550 rpm and it was pressurized with ethylene to 550 psi. The reactor temperature and ethylene pressure were allowed to equilibrate for 15–20 minutes. The ethylene supply was then closed off. Agitation was reduced to 500 rpm.

The reaction was initiated by starting both slow-additions (no.1 and 2) at 2.5 hr. rates (80 cc/hr). After the initial temperature rise, about 2–5° C., the jacket temperature and oxidizer rate (no. 1) are adjusted to allow the temperature to reach 80° C. in about 30 minutes. The oxidizer rate is then adjusted to maintain a 20–30° C. average temperature delta (reaction temperature minus jacket temperature).

The reaction is run until the residual vinyl acetate is reduced to 1.5–2.0% (about 2–2.5 hrs). It is then cooled to 45° C. and transferred to the degassing tank to vent off residual ethylene pressure. Defoamer, Colloid 681f (Allied Colloids), was added to the degassing tank followed by finishing redox initiator. This includes 15 g of a 6% HP solution, waiting 5 minutes, then 15 g of a 4% SFS solution added over 15 minutes. This reduces the vinyl acetate to<0.5%. After cooling to 30° C., the pH is adjusted to 4–5 with 14% ammonium hydroxide.

The emulsion had the final properties:

| Solids, % | 56.0 |
|---|---|
| Viscosity (20 rpm, RVT#3) | 1870 cps |
| pH | 4.2 |
| % grit (200 mesh) | 0.015 |
| Tg, ° C. | +70° |

B. High Solids Emulsion

The initial charge to the reactor includes the following:

| Water (deionized) | 1050.0 g |
|---|---|
| Ferrous sulfate (1% aq. sol'n) | 16.0 |
| Airvol 205 (25% aq. sol'n) | 100.0 |
| Airvol 203 (25% aq. sol'n) | 375.0 |
| Disponil A3065 | 72.0 |
| Sodium bicarbonate | 0.7 |
| Seed Emulsion (55% solids) | 425.0 |
| Ascorbic acid | 1.5 |
| Phosphoric acid | 1.5 |
| Vinyl acetate | 4000.0 g |
| Ethylene—amount to equilibrate reactor to 600 psi at 50° C. | |
| Slow additions: | |
| 1. Water (deionized) | 200.0 g |
| t-butyl hydroperoxide (70% aq sol'n) | 14.0 |
| 2. Water (deionized) | 200.0 g |
| Ascorbic acid | 9.0 |

The pH of the initial aqueous charge was adjusted to 4.0–4.3 with the phosphoric acid.

A 10L stainless steel pressure reactor was filled with initial aqueous mix. It was flushed with nitrogen. With the agitation at about 250 rpm, the vinyl acetate was added. After closing all reactor ports, it was purged twice with nitrogen (25 to 40 psi) and then with ethylene (50 psi). It was then heated to 50° C. Agitation was increased to 550 rpm and it was pressurized with ethylene to 600 psi. The reactor temperature and ethylene pressure were allowed to equilibrate for 15–20 minutes. The ethylene supply was then closed off. Agitation was reduced to 500 rpm.

The reaction was initiated by starting both slow-additions (no.1 and 2) at 2.5 hr. rates (80 cc/hr). After the initial temperature rise, about 2–5° C., the jacket temperature and oxidizer rate (no.1) were adjusted to allow the temperature to reach 80° C. in about 30 minutes. The oxidizer rate was then adjusted to maintain a 20–30° C. average temperature delta (reaction temperature minus jacket temperature).

The reaction was run until the residual vinyl acetate is reduced to 1.5–2.0% (about 2–2.5 hrs). It was then cooled to 45° C. and transferred to the degassing tank to vent off residual ethylene pressure. Defoamer, Colloid 681f (Allied Colloids), was added to the degassing tank followed by finishing redox initiator. This includes 15 g of a 6% t-BHP solution, waiting 5 minutes, then 15 g of a 6% ascorbic acid solution added over 15 minutes. This reduced the vinyl acetate to <0.5%. After cooling to 30° C., the pH was adjusted to 4–5 with 14% ammonium hydroxide.

The emulsion had the final properties:

| Solids; % | 71.8 |
|---|---|
| Viscosity (20 rpm, RVT#3) | 3240 cps |
| pH | 4.2 |
| % grit (200 mesh) | 0.015 |
| Tg, ° C. | 0 |

The following Examples 16–28 utilize seeds and emulsion procedures which are based on those described in Example 15. In all cases, the final emulsion solids were in the 72.5–73.5 range, but were adjusted to 72% for comparison of viscosity at similar solids.

As did Examples 2–14, these Examples illustrate the utility of this invention in producing high solids emulsions in the 70%–72% range with acceptable viscosity, 2000–5000 cps, using different seed emulsions, with different polyvinylalcohol and surfactant types and levels. Additionally, Examples 6–28 illustrate:

1. A range of seed solids: at 35–72%
2. Different seed compositions: acrylic, vinyl acetate, and vinyl-acrylic, vinyl acetate/ethylene
3. A range of seed particle sizes between 0.15 to 2.5 u as well as the use of blends of seeds.
4. Use of surfactant stabilized seeds.

EXAMPLE 16
(Use of a Higher Solids Seed)
A. The seed was modified as follows:
Final emulsion of Example 15 having a solids level of 70% was used as the seed.
B. The high solids emulsion was made in the same manner as Example 15.
Using 286 g of the seed emulsion of Example 15.

| Results: | 71.1% Solids | 2960 cps |
|---|---|---|

EXAMPLE 17
(Surfactant Stabilized Vinyl-acrylic Seed)
A. A surfactant stabilized vinyl acetate-butyl acrylate (955) latex of 0.2 u particle size was used as the seed. This latex was made by a conventional slow-add process using a combination of 1 part and 2 parts anionic(alkyl sulfosuccinate-nonionic surfactant (alkyl phenol ethoxylate, 40EO). It had a solids level of 47% and a viscosity of 100cps.
B. The final emulsion was prepared as in Example 15 using 500 g of the vinyl acrylic seed.

| Results: | 71.9% Solids | 7000 cps |
|---|---|---|

EXAMPLE 18
(Surfactant Stabilized Seed)
A. An ethylene/vinyl acetate seed emulsion was prepared as in Example 15 except surfactant was used in place of the polyvinylalcohol(PVOH). The recipe was changed as follows:

| Water (deionized) | 2300.0 g |
|---|---|
| Ferrous sulfate (1% aq. sol'n) | 16.0 |
| Aerosol A102 | 75.0 |
| Tergitol 15S5 | 16.0 |
| Tergitol 15S40(70%) | 55.0 |
| Sodium acetate | 0.5 |
| Sodium vinyl sulfonate | 96.0 |
| Ascorbic acid | 1.8 |
| Phosphoric acid | 1.5 |
| Vinyl acetate | 1000.0 g |
| Ethylene—amount to equilibrate reactor to 650 psi at 50° C. | |
| Slow additions: | |
| Emulsified mix: | |
| Water (deionized) | 650.0 g |
| Aerosol A102 | 75.0 |
| Tergitol 15S5 | 16.0 |
| Tergitol 15S40(70%) | 85.0 |
| Sodium acetate | 1.8 |
| Vinyl acetate | 2400.0 |
| Acrylic acid | 48.0 |
| 1. Water (deionized) | 300.0 g |
| T-butyl hydroperoxide (70% aq. sol'n) | 16.0 |
| 2. Water (deionized) | 300.0 g |
| Ascorbic acid | 12.0 |

The pH of the initial aqueous charge was adjusted to 4.0–4.3 with the phosphoric acid.

A 10L stainless steel pressure reactor was filled with the initial aqueous mix. It was flushed with nitrogen. With the agitation at about 250 rpm, the vinyl acetate was added. After closing all reactor ports, it was purged twice with nitrogen (25 to 40 psi) and then with ethylene (50 psi). It was then heated to 50° C. Agitation was increased to 550 rpm and it was pressurized with ethylene to 650 psi. The reactor temperature and ethylene pressure were allowed to equilibrate for 15–20 minutes. The ethylene supply was then closed off. Agitation was reduced to 500 rpm.

The reaction was initiated by starting both slow-additions (no.1 and 2) at 2.5 hr. rates (80 cc/hr). After the initial temperature rise, about 2–5° C., the jacket temperature and oxidizer rate (no.1) were adjusted to allow the temperature to reach 75° C. in about 20 minutes. The oxidizer rate was then adjusted to maintain a 20–30° C. average temperature delta (reaction temperature minus jacket temperature). After the initial 2° C. temperature rise the emulsified mix slow-add was started at a 3½ hr rate.

The reaction was run until the residual vinyl acetate was reduced to 1.5–2.0% (about 2–2.5 hrs). It was then cooled to 45° C. and transferred to the degassing tank to vent off residual ethylene pressure. Defoamer, Colloid 681f (Allied Colloids), was added to the degassing tank followed by finishing redox initiator. This includes 15 g of a 6% t-butyl hydroperoxide solution, waiting 5 minutes, then 15 g of a 4% ascorbic acid solution added over 15 minutes. This reduced the vinyl acetate to<0.5%. After cooling to 30° C., the pH was adjusted to 4–5 with 14% ammonium hydroxide.

The resultant seed emulsion comprised 83 parts vinyl acetate, 17 parts ethylene and 1.2 parts acrylic acid and had the final properties:

| Solids, % | 52.3 | |
|---|---|---|
| Viscosity (20 rpm, RVT#3) | 70 | cps |
| pH | 4.2 | |
| % grit (200 mesh) | 0.02 | |
| Tg, °C. | +20° | |

B. The final emulsion was prepared as in Example 15 using 448 g of the seed.

| Results: | 70.7% Solids | 8100 cps |

EXAMPLE 19
(Acrylic Seed; Large Particle Size)

A. A methylmethacrylate/butyl acrylate seed (60/40), at +20° C. Tg, with narrow particle size distribution (1.2 u), was prepared by a seeded step growth process described in U.S. Pat. No. 5,455,315 Paine et al and J.Polym. Science Part A: Polymer Chemistry, Vol.33, 1849 (1995). The resultant emulsion was at 30% solids.

B. The final emulsion was prepared as in Example 15 using 870 grams of the seed latex.

| Results: | 72.0% Solids | 5250 cps |

EXAMPLE 20
(Acrylic Seed; Large Particle Size)

A. The acrylic seed, at +20° C. Tg, with narrow particle size distribution (2.2 u), was prepared by a seeded step growth process described in Example 19. This material was at 30% solids.

B. The final emulsion was prepared as in Example 1.

| Results: | 72.5% Solids | 10820 cps Viscosity |
| diluted to | 71.0% Solids | 3300 cps Viscosity |

EXAMPLE 21
(Vinyl Acetate Homopolymer Seed)

A. The seed emulsion selected was a PVOH stabilized vinyl acetate homopolymer. This was prepared similar to Example 15 seed using a combination of Airvol A523 and A205 PVOH, and only vinyl acetate monomer. No ethylene was added.

The particle size of this emulsion was 0.8 u.

| Seed Results: | 55% Solids | 1200 cps Viscosity |

B. The final emulsion was prepared as in Example 15.

| Results: | 71.9% Solids | 3280 cps Viscosity |

EXAMPLE 22
(Standard Seed at a Higher Level)

A. The seed of Example 15 was used.

B. The final emulsion was prepared as in Example 15 with the level of seed used increased to 850 g. (10% actives)

| Results: | 72.8% Solids | 3800 cps. Viscosity |

EXAMPLE 23–28

A. Blends of two different particle size seeds were used as the seed emulsion in the preparation of the high solid Example 15B recipe. The seeds included combinations of different particle sizes as listed in Table 1.

B. The final emulsion was prepared as in Example 15. The level of seed was adjusted in each case to provide the level of active parts as listed in the Table 1, and the water level was adjusted to maintain the final solids in the range of 72%. The results are given in the table.

TABLE I

| Example Number | Seed | P.S. (u) | Seed Level | Seed Comp | Final Solids | Final Viscosity |
|---|---|---|---|---|---|---|
| 15 | 15A | 0.6 | 5 | EVA | 71.8 | 3240 |
| 16 | 15b | 1.2 | 5 | EVA | 71.1 | 2960 |
| 17 | 17A | 0.16 | 5 | VAcrylic | 71.9 | 7000 |
| 18 | 18A | 0.14 | 5 | EVA | 70.0 | 8100 |
| 19 | 19A | 1.2 | 5 | Acrylic | 72 | 5250 |
| 20 | 20A | 2.2 | 5 | Acrylic | 72.5 | 10820 |
|    |     |     |   |         | 71.0 | 3300 |
| 21 | 21A | 0.8 | 5 | VA | 71.9 | 3280 |
| 22 | 15A | 0.6 | 10 | EVA | 72.8 | 3800 |
| 23 | 15A/17A | 0.6 + 0.2 | 10 | EVA/VA | 72 | 6000 |
| 24 | 15A/21A | 0.6 + 0.8 | 10 | EVA/VA | 72.2 | 2160 |
| 25 | 15/15A | 0.6 + 1.5 | 10 | EVA | 73.2 | 6100 |
| 26 | 21A/17A | 0.8 + 0.2 | 10 | VA | 72.5 | 3360 |
| 27 | 21A/17A | 0.8 + 0.2 | 10/5 | VA | 71.7 | 7230 |
| 28 | 21A/15A/17A | 0.8/0.7/0.2 | 10 | EVA/VA | 72.2 | 8900 |

The results presented in Table I show the range of seed compositions which can be used in this process to produce the ultra high solids emulsions. These data demonstrate the variety of seed solids compositions and particle sizes which can be employed. Optimum compositions can be selected to provide the desired end use properties and final solids/viscosity.

We claim:

1. A process for the production of ethylene vinyl acetate based polymer emulsions having solids levels greater than 65% by weight comprising the steps of:
   i) providing a polymer seed selected from the group consisting of vinyl acetate, ethylene vinyl acetate, acrylic, vinyl-acrylic and styrene (meth) acrylic polymer having a particle size of 0.15 to 2.5 microns;
   ii) polymerizing vinyl acetate and ethylene monomers in the presence of 5 to 15% by weight of the final emulsion of said polymer seed;
   said polymerization of step (ii) being carried out in the presence of a surfactant system comprising polyvinyl alcohol and a nonionic emulsifier.

2. The process of claim 1 wherein the ethylene vinyl acetate polymer emulsion has a solids level of greater than about 70% by weight.

3. The process of claim 2 wherein the ethylene vinyl acetate polymer emulsion has a solids level of 72 to 74% by weight.

4. The process of claim 1 wherein the polymer seed has a particle size of 0.3 to 1 microns.

5. The process of claim 1 wherein the polymer seed is prepared in the presence of 1 to 5% by weight polyvinyl alcohol.

6. The process of claim 1 wherein the polymer seed is prepared in the presence of 1 to 5% by weight of an anionic surfactant or a blend of anionic and nonionic surfactants.

7. The process of claim 1 wherein the polymer seed emulsion has a solids level of within the range of 55 to 70% by weight.

8. The process of claim 1 wherein the polymer seed used in polymerization step (ii) in an amount of 5 to 10% by weight of the final emulsion.

9. A process for the production of ethylene vinyl acetate based polymer emulsions having solids levels greater than 65% by weight comprising the steps of:

i) providing a vinyl acetate or ethylene vinyl acetate polymer seed having a particle size of 0.3 to 1 microns;

ii) polymerizing vinyl acetate and ethylene monomers in the presence of 5 to 15% by weight of the final emulsion of said polymer seed;

said polymerization of step (ii) being carried out in the presence of a surfactant system comprising polyvinyl alcohol and a nonionic emulsifier;

said ethylene vinyl acetate polymer emulsion being characterized by a coating viscosity of 1000 to 8000 cps. at 25° C.

10. The process of claim 9 wherein the ethylene vinyl acetate polymer emulsion has a solids level of greater than about 70% by weight.

11. The process of claim 10 wherein the ethylene vinyl acetate polymer emulsion has a solids level of 72 to 74% by weight.

12. The process of claim 9 wherein the polymer seed has a particle size of 0.4 to 0.8 microns.

13. The process of claim 9 wherein the polymer seed is prepared in the presence of 1 to 5% by weight polyvinyl alcohol.

14. The process of claim 9 wherein the polymer seed emulsion has a solids level of about 55% by weight.

15. The process of claim 9 wherein the polymer seed used in polymerization step (ii) in an amount of 5 to 10% by weight of the final emulsion.

16. The process of claim 1 wherein there is additionally present in polymerization step (ii) 1 to 5% by weight of a functional monomer.

17. The process of claim 16 wherein the functional monomer is selected from the group consisting of acrylic acid, methacrylic acid, maleic acid, hydroxyethylacrylate, hydroxypropylacrylate, acrylamide and N-vinyl formamide.

18. The process of claim 9 wherein the polymerization step (ii) is carried out in the presence of 1 to 5% polyvinyl alcohol and 1 to 5% of a nonionic emulsifying agent, the combined amounts of polyvinyl alcohol and emulsifying agent being in the range of 3.5 to 6% by weight of the emulsion.

19. The process of claim 18 wherein the emulsifying agent is selected from the group consisting of polyoxyethylene condensates represented by the following general formula:

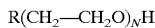

where R is the residue of a fatty alcohol, acid amide, alkyl phenol or amine having from 10 to 24 carbon atoms or an alkyl phenol having from 10 to 24 carbon atoms; and where n is an integer of 1 or above and preferably between 5 and 70.

20. The process of claim 19 wherein the emulsifying agent is an ethyoxylated alkyl phenol or ethoxylated C11 to C 15 alcohol containing 20 to 50 moles of ethylene oxide.

21. The process of claim 1 wherein the polymerization step (ii) is a batch polymerization.

22. The process of claim 1 wherein the polymerization step (ii) is a slow addition process wherein a major portion of the vinyl acetate is added to the initial charge and the remaining portion slow added during the polymerization.

* * * * *